United States Patent [19]

Sano et al.

[11] Patent Number: 5,425,067

[45] Date of Patent: Jun. 13, 1995

[54] X-RAY TUBE NOISE AND VIBRATION REDUCTION

[75] Inventors: Richard R. Sano, Salt Lake City; George Antonsen, Park City; Gregory C. Andrews, Salt Lake City, all of Utah

[73] Assignee: Varian Associates, Inc., Palo Alto, Calif.

[21] Appl. No.: 227,215

[22] Filed: Apr. 13, 1994

[51] Int. Cl.6 .............................................. H01J 35/10
[52] U.S. Cl. .................................... 378/125; 378/132
[58] Field of Search ............... 378/119, 121, 125, 132, 378/135, 139, 144, 201, 193, 131

[56] References Cited

U.S. PATENT DOCUMENTS

| | | |
|---|---|---|
| 3,855,492 | 12/1974 | Langer et al. ........................ 378/125 |
| 4,182,512 | 1/1980 | Kuebler . |
| 4,207,841 | 6/1980 | Bloomer . |
| 4,433,432 | 2/1984 | Nii et al. ........................ 378/202 X |
| 4,635,283 | 1/1987 | Starek et al. ..................... 378/125 X |
| 4,935,948 | 6/1990 | Kim ................................. 378/132 X |
| 5,253,284 | 10/1993 | Kim ....................................... 378/121 |
| 5,265,147 | 11/1993 | Kim et al. ........................ 378/132 X |

FOREIGN PATENT DOCUMENTS 60-3898  1/1985  Japan ............................. H05G 1/04

Primary Examiner—David P. Porta
Attorney, Agent, or Firm—Bella Fishman

[57] ABSTRACT

An X-ray tube construction of the rotating anode type for reducing acoustic noise and vibration by using granules which are placed loosely within an anode cavity formed between the outer surface of an anode shank and a wall of an anode sleeve in proximity to a bearing journaled to a rotor shaft for rotation of an anode structure.

16 Claims, 4 Drawing Sheets

X-RAY TUBE NOISE AND VIBRATION REDUCTION

FIELD OF THE INVENTION

The invention relates generally to X-ray tubes of the rotating anode type and is concerned more particularly with an X-ray tube having an anode structure utilizing an anode shank vibration absorber to reduce acoustic noise and vibration produced by the X-ray tube.

BACKGROUND OF THE INVENTION

A conventional X-ray tube of the rotating anode type comprises a vacuum envelope having transversely disposed therein an anode target disk having a radially sloped surface with a focal spot area disposed in spaced alignment with an electron emitting cathode. A beam of electrons from the cathode being focused onto the aligned focal spot area of the target strikes the focal spot area and generates X-rays. The kinetic energy of the electrons bombarding the focal spot area of the target is partially converted into heat. In order to distribute the thermal load, the target disk is rotated at approximately 3,000 to 10,000 rpm. The target disk is mounted on a rotatable shaft which is coupled to the vacuum tube via bearings. The use of such X-ray tubes for medical diagnostics is quite common.

The rotation of the rotor anode structure generates vibration initiated by high rotation speeds and accelerations to which the rotor anode structure is exposed. A portion of this vibration ultimately is transmitted through the X-ray tube housing surrounding the vacuum tube. The space between a vacuum envelope and the housing is filled with oil which is used for X-ray vacuum tube heat dissipation and for dielectric purposes. When this vibration reaches the housing, it is radiated as noise. This acoustic noise has become a great concern to medical staffs and patients.

A number of the attempts have been made to reduce the vibration which leads to the noise. Attempts to reduce noise such as lowering the rotation speed of the target resulted in shortened life expectancy of the target. Certain efforts have been made to reduce X-ray tube noise without shortening target life expectancy by adding a mass on an anode shank mounting area. U.S. Pat. No. 4,935,948 "X-Ray Tube Noise Reduction by Mounting a Ring Mass" discloses attaching a ring mass on or near the bearing shroud which physically connects the rotor bearings to the vacuum tube. Such a ring mass significantly increases the overall weight of the X-ray tube, and, being located near a high voltage region within the X-ray tube, creates electrical instability.

An alternative approach to noise reduction in X-ray tubes is described in the U.S. Pat. No. 5,253,284 "X-Ray Tube Noise Reduction Using Non-Glass Inserts". Although theoretically satisfactory in certain respects, such X-ray tubes still suffer from significant disadvantages. Thus, by its very nature, the junctions of glass and non-glass materials create manufacturing problems. These problems affect vacuum integrity, radically change the electrical characteristics of the tube, require extensive re-design, and add to the costs of the product.

Yet another conventional approach to noise reduction relies on mechanically isolating the moving parts of the device (rotating target assembly and bearings) from the housing. A typical application of this approach is disclosed in Japanese patent application 60-3898 "X-Ray Tube Device With Rotating Anode". Aside from questions of efficacy, a serious problem with this noise-reduction strategy is that, isolation of the X-ray tube may cause image degradation, since vibrational energy is redistributed, being partially applied to the X-ray tube insert. The quality of output images from computer tomographies and other software-enhanced X-ray diagnostic systems is highly dependent on the focal spot stability.

SUMMARY OF THE INVENTION

Accordingly, these and other disadvantages of the prior art are overcome by this invention providing an X-ray tube comprising a housing with an X-ray insert disposed therein. The X-ray insert has a vacuum envelope with a neck and a bulb portions, and anode structure. The anode structure further comprises a first end positioned in the bulb portion of the envelope and a second end positioned in the neck portion of the envelope; a target mounted on the first end; an anode shaft rotatably attached to the target. The second end of the anode structure further comprises an anode sleeve fixed to the vacuum envelope and anode shank coupled to the anode sleeve by retaining means to define an anode cavity between the shank and the sleeve. The granules are distributed loosely into the anode cavity.

The main advantage of the present invention is that the loose granules placed in the anode cavity absorb a portion of the vibrational energy resulting from the rotation of the rotor at a location near where the primary noise is generated.

It is another advantage of the present invention that the method of attenuation of the vibrational energy requires no laborious and time consuming operations in manufacturing.

It is yet another advantage of the present invention that the design introduces no significant changes to the electrical characteristics of a typical X-ray tube.

It is a further advantage of the present invention that the use of the vibration absorber results in minimal additional weight of the X-ray tube.

It is still a further advantage of the present invention that a wide variety of conventional X-ray tube designs may be readily adapted to the described technology, with no major design modifications required.

These and other features and advantages of the present invention will become clear from the detailed description given below in which a preferred embodiment is described in relation to the drawings. The detailed description is presented to illustrate the present invention, but is not intended to limit it.

DETAILED DESCRIPTION OF THE INVENTION

Figure 1:
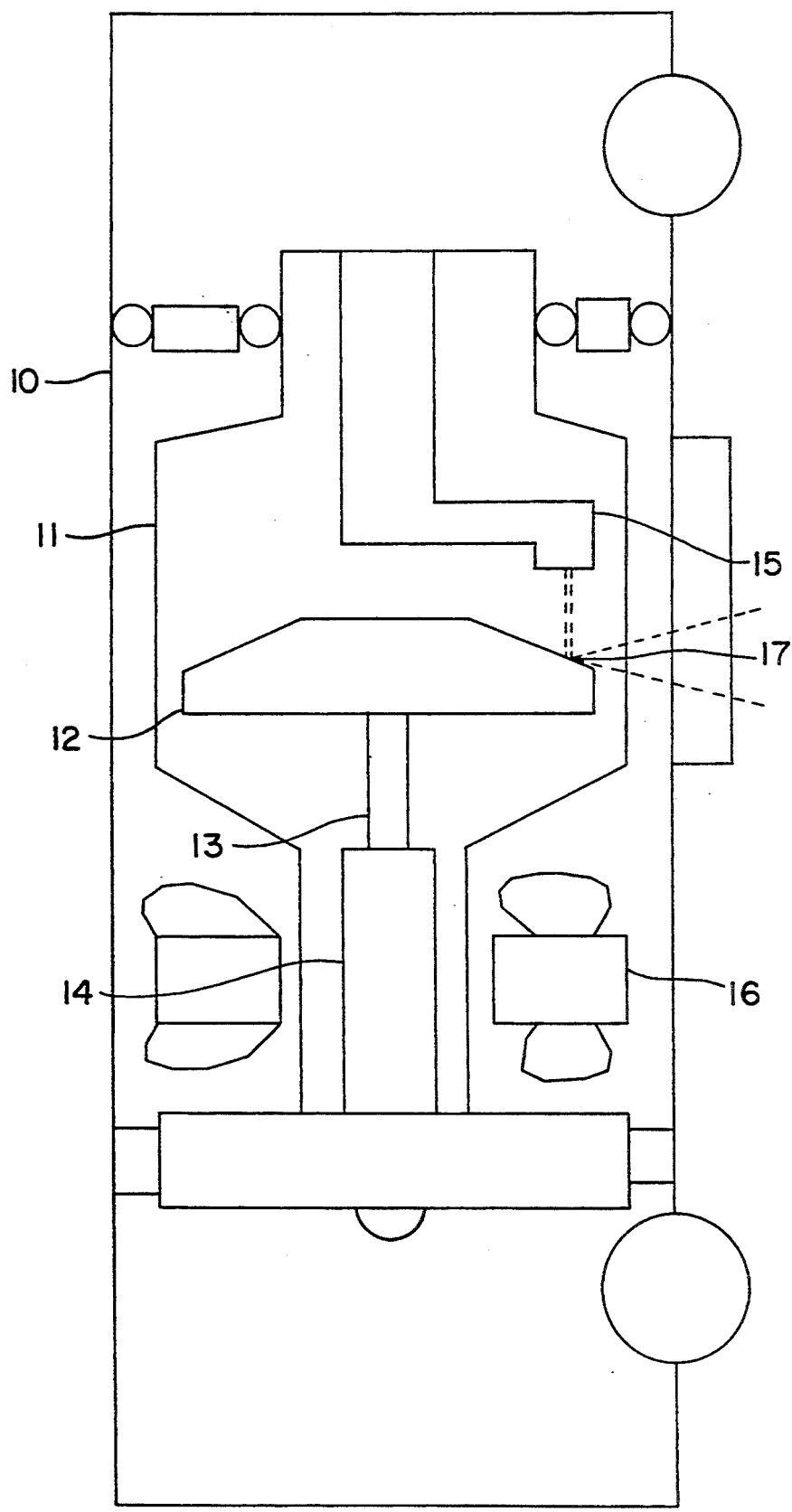
FIG. 1 shows a simplified side view cross-section of a conventional X-ray tube with the elements shown schematically.

Referring to FIG. 1, there is shown a simplified structure of a conventional X-ray tube 10 having a tube insert 11. X-ray tube 10 is a rotating anode type X-ray tube. An anode assembly comprises target 12 connected to shaft 13. Bearing assembly 14 serves to facilitate the rotation of anode target 12. The anode is spaced apart from and oppositely disposed from cathode 15. The cathode structure includes a cathode head and a filament which is connected to an appropriate power source. The cathode and anode are located within a vacuum envelope of X-ray insert 11. Stator assembly 16 is placed around the neck portion of the vacuum envelope of X-ray insert 11. When stator 16 generates a rotating magnetic field the rotor which opposes stator through the wall of the vacuum envelope (not shown) and anode assembly rotates at a predetermined high speed.

An electron beam is generated from cathode 15 by applying a high voltage between cathode 15 and anode target 12, and is radiated onto the focal spot area 17. The electrons bombard the focal spot area with sufficient kinetic energy to generate X-rays. The X-rays emitted from the surface in the direction represented by dotted lines in FIG. 1 are used to produce medical images.

The quality of image obtained by processing the data from the X-ray tube, and as a result, the diagnostic capability, depends on changes in relative position of the target. All uncontrolled changes in position of the focal spot are undesirable. One of the reasons for migration of the focal spot 17 on anode target 12 is vibration of the X-ray tube components in operation, induced by rotation of the anode structure 12–14.

Figure 2:
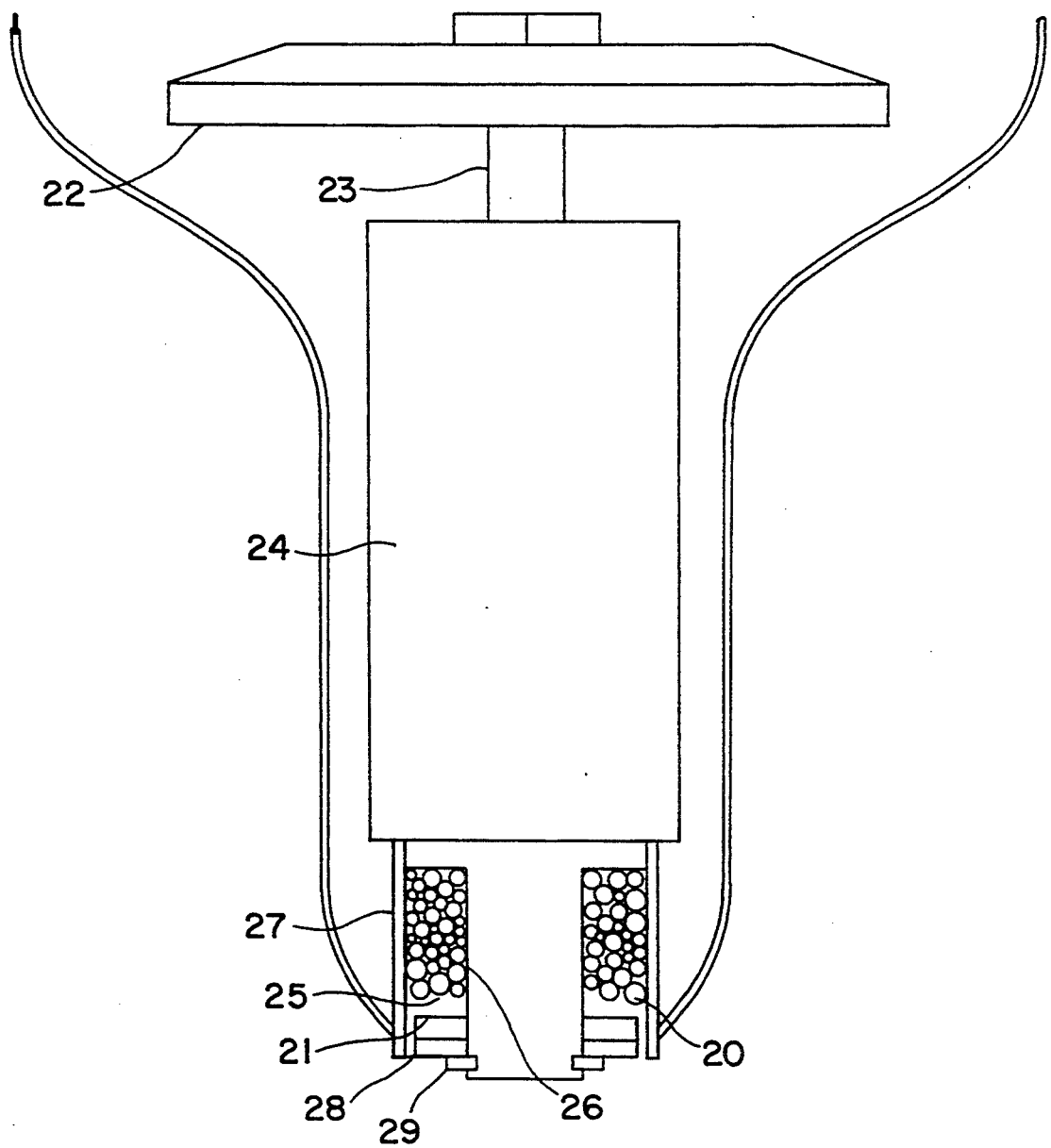
FIG. 2 shows a partial side view cross-section of the X-ray tube of the present invention.

In a preferred embodiment, shown in particular in FIG. 2, the vibrational energy initiated by rotation of anode target 22 and anode shaft 23 via bearing assembly 24 is transmitted to anode shank cavity 25 which is defined by outer wall 26 of anode shank and anode sleeve wall 27. Granules 20 are distributed loosely in anode cavity 25 and retained inside this cavity by means of retaining washer 28 which is secured by clip ring 29. Retaining washer 28 comprises vibration isolation material 21 deposited on the inner surface of the washer facing the granules. Cork or a polymer acoustic dampener can be used as a vibration isolation material.

In operation, when anode shank 25 or anode sleeve wall 27 is excited by the energy of bearing assembly 24, the granules neighboring anode shank 25 or anode sleeve wall 27 acquire kinetic energy from these surfaces and move inside the cavity. A portion of the energy imparted to the granules is converted to heat due to frictional energy losses; the remaining energy is of low (i.e., sub-acoustic) frequency, since the granule velocities are slow relative to the original acoustic vibrations. Isolation material 21 absorbs additional vibrational energy of granules 20 when the X-ray tube is operated in anode down or horizontal position.

Figure 3A:
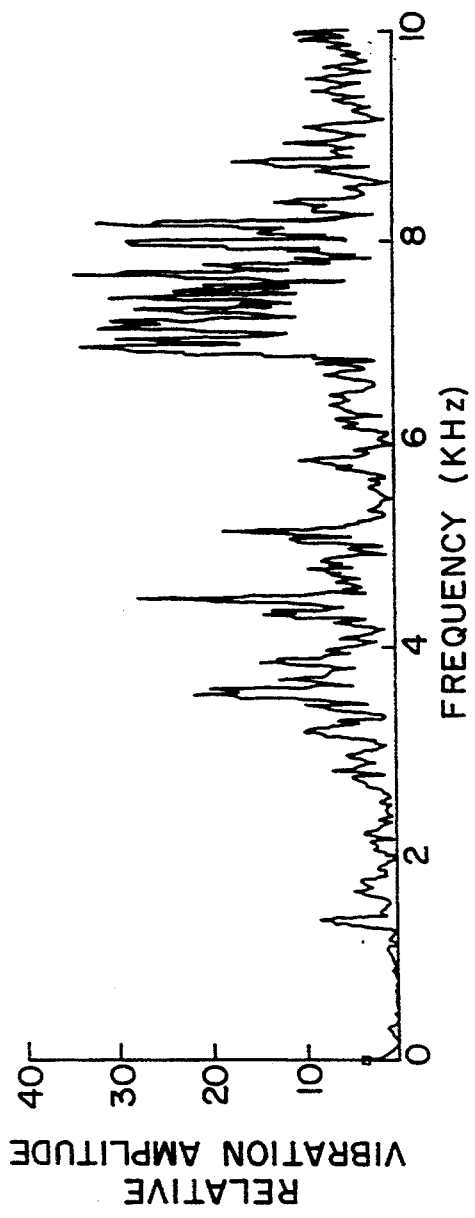
FIG. 3A shows a distribution of relative vibration amplitudes in a frequency range of 1–10 KHz for conventional X-ray tube.
Figure 3B:
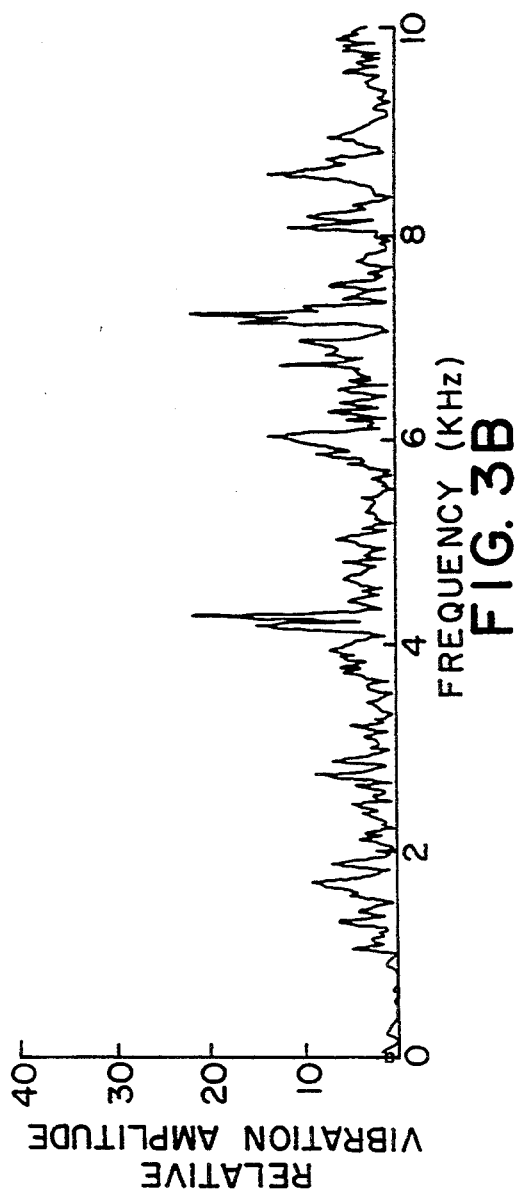
FIG. 3B shows a distribution of relative vibrations amplitudes in a frequency range of 1–10 KHz for the present invention.

The experimental graphs of FIG. 3A–3B show the reduction level affected by the new design of X-ray tube (FIG. 3B) compared to the conventional one (FIG. 3A). Results were obtained for the granules having diameters of about 4 mm and weight 0.25 gm. The diameter of the granules may vary depending on the type of the X-ray device in the approximate range of 0.1–1 cm, and weight may vary in the approximate range of 0.1 gm–1 gm.

Figure 4:
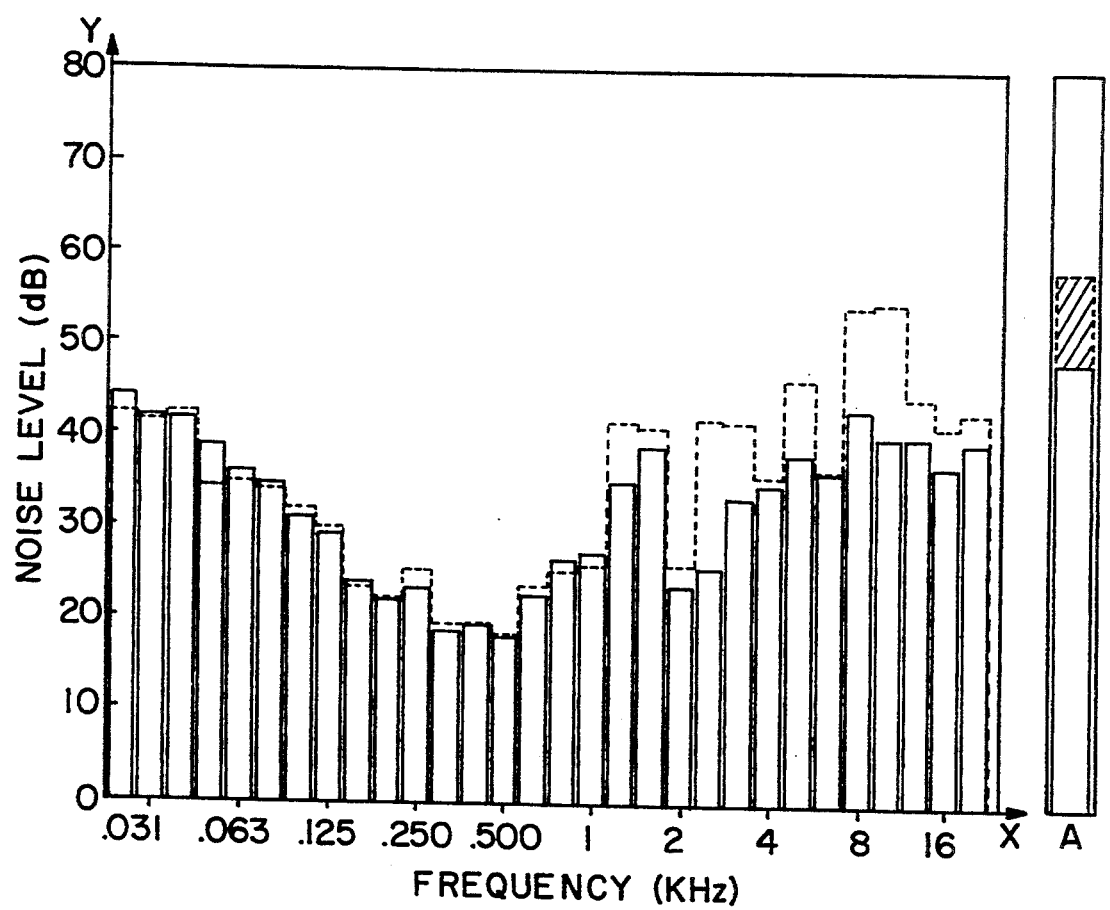
FIG. 4 shows a noise histogram of the present invention in comparison to a noise histogram of a conventional X-ray tube.

The noise histograms of FIG. 4 show a comparison of sound pressure level for conventional X-ray tube (dotted line) and the present invention (solid line) respectively. The preferred series of $\frac{1}{3}$ octave bands for these acoustic measurements cover the audible range in ten bands. The center frequencies of these bands are shown on axis X. Based on the measurements conducted at 1.0 meter from the X-ray tube, the vibration absorber of the present invention allows a 9.3 dB(A) reduction in noise (cross-slashed column). This data was calculated with respect to an A-weighted sound pressure level algorithm.

Generally, any use of unconstrained or partially constrained particles applied to the surface of the X-ray tube so as to absorb vibrational energy from said surface, should be recognized as an application of this invention.

For example, the granules may be applied outside of the X-ray insert in proximity to the neck portion of the X-ray tube, or inside of the X-ray insert in proximity to the cathode structure.

The disclosed invention allows reducing the vibrational energy at the source of its excitation before this energy is transmitted to the vacuum envelope and further to the housing of the X-ray tube.

The present invention has been described with reference to the preferred embodiment. Obviously, modifications and alterations will be obvious to others skilled in art upon reading and understanding the preceding detailed description. It is intended that the invention be construed as including all such modifications and alterations insofar as they come within the scope of the appended claims or the equivalents thereof.

What is claimed is:

1. An X-ray tube comprising:
   a housing;
   an X-ray insert disposed within said housing, said X-ray insert having a vacuum envelope with a neck portion and a bulb portion;
   an anode structure having a first end disposed within said bulb portion and a second end disposed within said neck portion, a target mounted on said first end, anode shaft rotatably attached to said target, said second end further comprising an anode sleeve and an anode shank coupling by a retaining means to define an anode cavity therebetween;
   granules, said granules distributed loosely within said anode cavity for absorbing the vibrational energy transmitted by said anode shaft.

2. The X-ray tube of claim 1, wherein said retaining means comprises a washer.

3. The X-ray tube of claim 2, wherein said retaining means further comprises an isolation material, said isolation material being fixed to said washer from an inner side of said anode cavity.

4. The X-ray tube of claim 3, wherein said retaining means further comprises a clip ring, said clip ring being fixed to said washer in opposed relationship to said isolation material.

5. An X-ray tube comprising:
   a housing;
   an X-ray insert disposed within said housing, said X-ray insert having a vacuum envelope with a neck portion and a bulb portion;
   a rotor shaft journaled in bearings for rotation within said envelope;

a target placed in said bulb portion of said envelope, said target having a portion secured to and engaging said shaft for rotation therewith;

an anode shank mounted to said rotor shaft, said shank having an outer cylindrical surface;

an anode sleeve wall fixed to said neck portion of said vacuum envelope, said anode sleeve wall spaced apart in opposed relationship to said outer cylindrical surface of said anode shank;

an anode seal, said anode seal connecting said outer wall of said anode shank to said anode sleeve wall;

a washer, said washer spaced apart to said anode seal in opposed relationship to said anode seal and connecting said outer surface of said anode shank wall to said anode sleeve wall;

said washer, anode sleeve, anode seal and outer surface of said anode shank defining an anode cavity;

granules, said granules placed into said anode cavity for absorbing the vibrational energy transmitted by said rotor shaft.

6. The X-ray tube of claim 5, wherein said anode cavity further comprises an isolation material in the interior of said cavity, said isolation material deposited on said washer.

7. The X-ray tube of claim 6, wherein said isolation material is a plastic polymer.

8. The X-ray tube of claim 5, wherein said granules are made of lead.

9. The x-ray tube of claim 8, wherein said granules are pellets.

10. The X-ray tube of claim 9, wherein the diameter of each of said pellets is about 0.1–1 cm.

11. The X-ray tube of claim 10, wherein the preferred diameter of each said pellet is about 0.4 cm.

12. The X-ray tube of claim 5 further comprising a clip ring, said clip ring retaining said washer from the outer side of said anode cavity.

13. An X-ray tube comprising;

a housing;

an X-ray insert disposed within said housing, said insert having:

a vacuum envelope, a first and second electrode structure disposed within said envelope, said first electrode structure forming an anode, said anode comprising a target and a shaft rotatably attached to said target, said second electrode structure forming a cathode, said cathode spaced apart from and oppositely disposed from said anode;

a vibration absorbing means disposed in energy exchanging relationship with at least one of said electrode structure, said vibration absorbing means having a containment means and granules, said granules distributed loosely within said containment means for dissipating the vibrational energy transmitted by said shaft of said anode.

14. A method of attenuating the vibrational energy of an X-ray tube generated by a rotor shaft within the X-ray tube having a rotating anode structure which is coupled to a vacuum envelope of said X-ray tube via bearings, said method comprising the steps of:

providing an anode shank at a neck portion of said X-ray tube, said shank having an outer cylindrical surface;

mounting said anode shank to said rotor shaft;

forming an anode cavity in proximity to said bearings between said outer cylindrical surface of said shank and an anode sleeve wall of said rotating anode structure;

distributing granules loosely into said anode cavity;

shielding said anode cavity with said granules by a cover, wherein, in operation, the vibrational energy excited by said rotor shaft is transmitted via bearings to said anode cavity and absorbed by said granules.

15. The method of claim 14, wherein said cover for shielding said anode cavity is a washer with an isolation material, said isolation material is deposited on said washer and facing said granules.

16. The method of claim 15 further comprising a step of securing said cover of said anode cavity by clip ring, wherein said clip ring is fixed to said cover from the outer side of said anode cavity.

* * * * *